United States Patent
Salmeen et al.

(10) Patent No.: US 7,188,012 B2
(45) Date of Patent: Mar. 6, 2007

(54) ADAPTIVE VOICE CONTROL AND VEHICLE COLLISION WARNING AND COUNTERMEASURE SYSTEM

(75) Inventors: Irv T. Salmeen, Ann Arbor, MI (US); Gary S. Strumolo, Beverly Hills, MI (US); Ronald H. Miller, Saline, MI (US); David D. DiMeo, Windsor, CA (US); Anna Zevalkink, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 142 days.

(21) Appl. No.: 10/711,109

(22) Filed: Aug. 24, 2004

(65) Prior Publication Data

US 2006/0271258 A1    Nov. 30, 2006

(51) Int. Cl.
 B60R 22/00    (2006.01)
(52) U.S. Cl. ............................. 701/45; 701/36; 180/169
(58) Field of Classification Search .................... 701/1, 701/36, 45, 46, 49; 180/169, 170, 171
 See application file for complete search history.

(56) References Cited

U.S. PATENT DOCUMENTS

| | | | |
|---|---|---|---|
| 4,827,520 A | 5/1989 | Zeinstra | |
| 5,214,707 A | 5/1993 | Fujimoto et al. | |
| 5,570,087 A | 10/1996 | Lemelson | |
| 6,154,123 A | 11/2000 | Kleinberg | |
| 6,236,968 B1 | 5/2001 | Kanevsky et al. | |
| 6,240,347 B1 | 5/2001 | Everhart et al. | |
| 6,304,817 B1 | 10/2001 | Troedel | |
| 6,442,484 B1 | 8/2002 | Miller et al. | |
| 6,452,535 B1 | 9/2002 | Rao et al. | |
| 6,580,973 B2 | 6/2003 | Leivian et al. | |
| 6,636,149 B2 | 10/2003 | Moon | |

*Primary Examiner*—Gertrude A. Jeanglaude
(74) *Attorney, Agent, or Firm*—Frank A. MacKenzie; Artz & Artz, P.C.

(57) ABSTRACT

A safety system (10) for a host vehicle (12) includes a voice sensor (38) that detects voice signals from a vehicle occupant. An occupant classifier (30) determines a state of mind of the vehicle occupant. A controller (13) performs a safety countermeasure in response to the state of mind of the occupant including the transmission of the state of mind to a target vehicle. A vehicle voice control system (24) includes the voice sensor (38), which detects voice signals from the vehicle occupant. A speech classifier (32) monitors a speech characteristic, including a vehicle occupant identifiable and associated speech characteristic, in response to the voice signals and associates the voice signals with a vehicle related task in response thereto. A controller (13) performs the vehicle related task in response to the voice signals and the association.

20 Claims, 2 Drawing Sheets

ADAPTIVE VOICE CONTROL AND VEHICLE COLLISION WARNING AND COUNTERMEASURE SYSTEM

TECHNICAL FIELD

The present invention relates generally to voice control systems and to automobile collision detection, warning, and countermeasure systems. More particularly, the present invention relates to a system and method of assessing the state of a vehicle driver and of appropriately performing countermeasures in response to that assessment.

BACKGROUND OF THE INVENTION

Various sensing systems currently exist for performing collision warning and countermeasure system operations, such as detection, classification, tracking, and relative distance and velocity estimation of objects within a close proximity of a host vehicle. Sensing systems also exist for performing other sensing system operations, such as windshield wiper and defogger operations, occupant sensing, classification, and tracking operations, and adaptive cruise control operations.

Collision warning and countermeasure systems operations include providing a vehicle operator knowledge and awareness of vehicles and objects that are within a close proximity of the host vehicle to prevent colliding with those objects. Countermeasure systems exist in various passive and active forms. Some countermeasure systems are used to aid in the prevention of a collision, others are used to aid in the prevention of an injury to a vehicle occupant.

Certain collision warning and countermeasure systems are able to sense an object within a close proximity of the host vehicle and warn the host vehicle operator, such that the operator can take precautionary steps to prevent a collision or injury. Other collision warning and countermeasure systems activate passive or active countermeasures such as airbags, load limiting seatbelts, or brake control whereby the system itself aids in the prevention of a collision or an injury.

Occupant related operations include detecting occupant characteristics, determining which safety system countermeasures to perform, and adjusting times and rates of the countermeasures. Example restraint countermeasures that may be enabled are seat belt pretensioners and airbags. Occupant characteristics may include occupant positions within a seat, occupant size and weight, or other known physical occupant characteristics.

It is desirable to understand not only the physical characteristics of a vehicle driver, but also to understand the mental characteristics or mental state of mind of a vehicle driver. Knowledge of a driver state of mind can aid in the performance of collision warning and countermeasure systems. Such knowledge is not available with traditional collision warning and countermeasure systems. Thus, there exists a need for an improved collision warning and countermeasure system that accounts for a vehicle occupant state of mind. It is also desirable that such knowledge be obtained without interfering with driver focus and normal driving tasks, such as maintenance of driver hands on the steering wheel and driver eyesight on the road ahead.

SUMMARY OF THE INVENTION

One embodiment of the present invention provides a safety system for a host vehicle that includes a voice sensor. The voice sensor detects voice signals from a vehicle occupant. An occupant classifier determines a state of mind of the vehicle occupant. A controller performs a safety countermeasure in response to the state of mind of the occupant including the transmission of the state of mind to a target vehicle.

Another embodiment of the present invention provides a vehicle voice control system that also includes a voice sensor. The voice sensor detects voice signals from a vehicle occupant. A speech classifier monitors a speech characteristic, including a vehicle occupant identifiable and associated speech characteristic, in response to the voice signals and associates the voice signals with a vehicle related task in response thereto. A controller performs the vehicle related task in response to the voice signals and the association.

The embodiments of the present invention provide several advantages. One such advantage is the provision of a collision warning and countermeasure system that adaptively performs voice recognition to account for speech disorders and irregularities. In adaptively performing voice recognition customized verbal commands may also be entered and accounted.

Another advantage provided by an embodiment of the present invention is the provision of a safety system that determines that state of mind of a vehicle occupant and in response thereto performs a safety system countermeasure. The safety system aids in maintaining driver focus and awareness. In determining and understanding the state of mind of a vehicle driver a safety system can more appropriately perform safety countermeasures and can warn target vehicles that are in a close proximity, of that state of mind so that the target vehicle safety systems may also act accordingly.

Furthermore, the combination of the above stated advantages allows vehicle drivers to maintain their hands on the steering wheel and eye contact on the road ahead of the vehicle. The stated advantages also allow for improved techniques to be used in performing a collision threat assessment and in performing countermeasures to prevent a collision.

The present invention itself, together with attendant advantages, will be best understood by reference to the following detailed description, taken in conjunction with the accompanying figures.

BRIEF DESCRIPTION OF THE DRAWING

For a more complete understanding of this invention reference should now be had to the embodiments illustrated in greater detail in the accompanying figures and described below by way of examples of the invention wherein.

DETAILED DESCRIPTION

Figure 1:
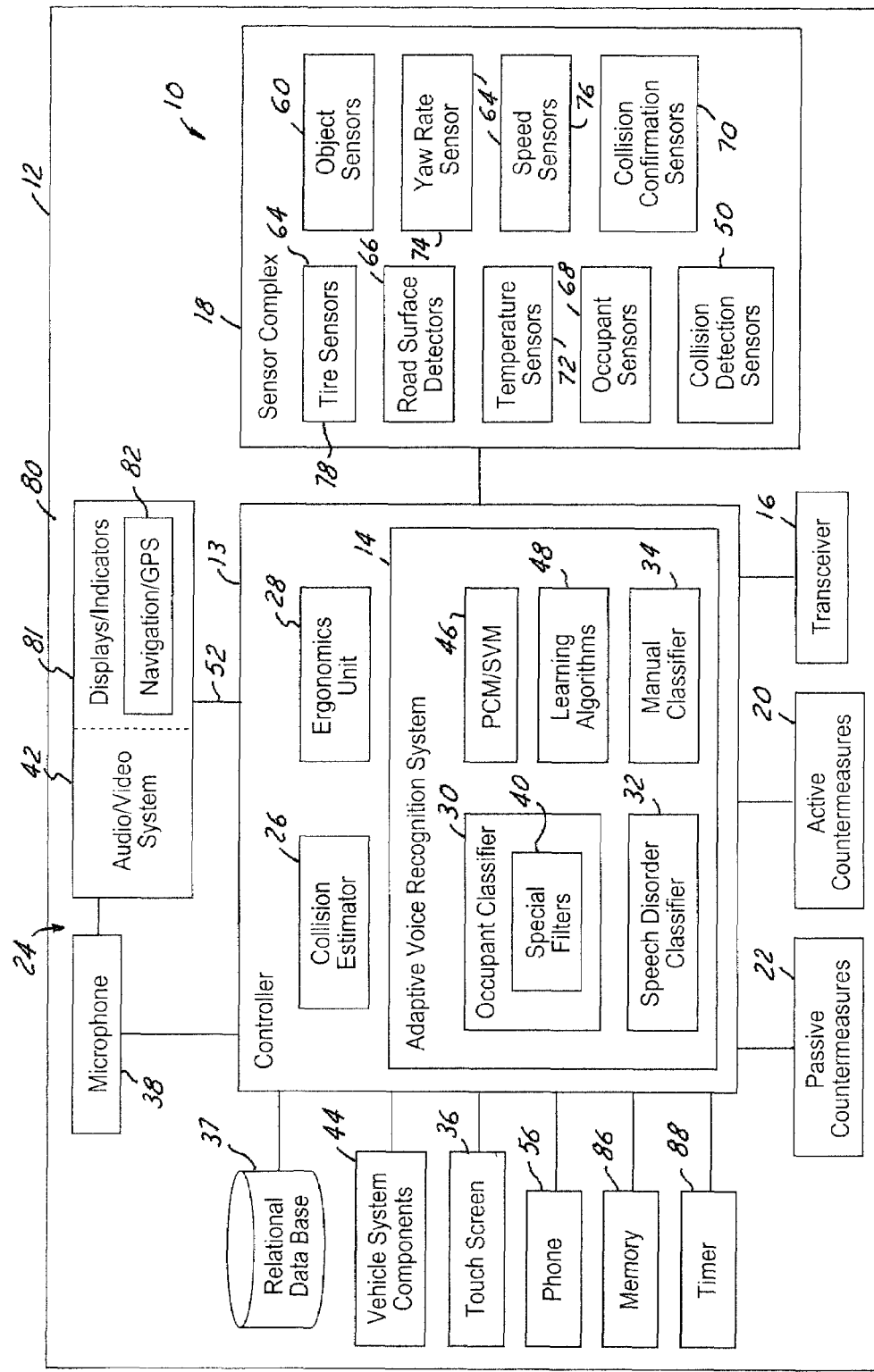
FIG. 1 is a block diagrammatic view of a collision warning and countermeasure system for a vehicle incorporating adaptive voice recognition in accordance with an embodiment of the present invention.

While the present invention is described with respect to a system and method of assessing the state of a vehicle driver and of appropriately performing countermeasures in response to that assessment, the present invention may be adapted to be used in various applications and systems including: collision warning systems, collision avoidance systems, voice command systems, parking-aid systems, reversing-aid systems, countermeasure systems, adaptive cruise control systems, lane departure systems, lane-keeping systems, or other vehicle systems known in the art. The present invention may be used to supplement a pre-collision sensing system.

In the following description, various operating parameters and components are described for one constructed embodiment. These specific parameters and components are included as examples and are not meant to be limiting.

Also, in the following description the term "performing" may include activating, deploying, initiating, powering, and other actions known in the art that may describe the manner in which a countermeasure may be operated.

Additionally, in the following description the term "countermeasure" may refer to an object or may refer to an action. For example, a countermeasure may be performed or a countermeasure may be activated. An airbag is a countermeasure. A controller may perform a countermeasure by signaling the airbag to deploy.

Moreover, a countermeasure device may be any device within an automotive vehicle that is used in conjunction with a collision countermeasure system including: a controller, a vehicle system, an indicator, a transceiver, or other countermeasure device known in the art.

Countermeasures may be reversible or irreversible. Reversible countermeasures refer to countermeasures that may be reset to their original form or used repeatedly without a significant amount of functional deficiency, which may be determined by a system designer. Irreversible countermeasures refer to countermeasures, such as airbags that, once deployed, are not reusable.

Furthermore, a countermeasure signal may include information pertaining to the above-stated reversible and irreversible countermeasures or may include other information, such as collision warning information, and parking-aid or reversing-aid countermeasure information. For example, the countermeasure signal may contain object detection information, which may be used to indicate to a vehicle operator the presence or close proximity of a detected object.

In addition, the term "object" may refer to any animate or inanimate object. An object may be a vehicle, a pedestrian, a lane marker, a road sign, a roadway lane designating line, a vehicle occupant, or other object known in the art.

As well, the term "collision type" refers to collision severity and collision contact location of a collision. Collision type may include whether a collision is a frontal-oblique, offset, or head-on collision, as well as refer to other collision location type descriptions known in the art. A collision type may also include information related to relative size, weight, and collision change-in-velocity, as well as other collision type related information known in the art.

Referring now to FIG. 1, a block diagrammatic view of a collision warning and countermeasure system or safety system 10 for a host vehicle 12 is shown incorporating adaptive voice recognition in accordance with an embodiment of the present invention. The safety system 10 includes a controller 13 with an adaptive voice recognition system 14, a transceiver 16, a sensor complex 18, and active countermeasures 20 and passive countermeasures 22, as well as various other system components that are all described in greater detail below. The controller 13 utilizes data collected from the adaptive voice recognition system 14, from the transceiver 16, the sensor complex 18, and from other system components to determine occupant characteristics, to estimate the potential for a collision, and to perform various countermeasures as appropriate.

The controller 13 includes the voice recognition system 14, which is part of a command control system 24, as well as a threat assessment module or collision estimator 26, and an ergonomics unit 28. The voice recognition system 14 is utilized to determine the state of mind and profile of a vehicle occupant, such as the driver of the vehicle 12. The command control system 24 is used to perform various tasks in response to voice commands by the occupant. The collision estimator 26 is utilized to determine the threat of detected objects in proximity with the vehicle 12 and to estimate the potential for a collision with those objects. The ergonomics unit 28 is utilized to control various creature comfort type systems, such as entertainment systems and heating ventilation and air conditioning (HVAC) systems.

The voice recognition system 14 includes an occupant classifier 30, a speech disorder classifier 32, and a manual classifier 34. The occupant classifier 30 is utilized to identify and to determine the profile and the state of mind of the occupant. The speech disorder classifier 32 is utilized to interpret verbal commands by the occupant including commands from an occupant that has a speech disorder, irregularity, or impediment, such as an accent or a lisp. The manual classifier 34 is utilized by the occupant to manually translate or relate a particular term or verbal command with a particular task to be performed. For example, the occupant may select a task on a manual input device or interface, such as the touch screen 36, and speak into the voice sensor 38, shown as a microphone, a verbal statement or command. A verbal command may be formed of any number of sounds or terms in length. The controller 13 may then associate the verbal command with the selected task.

The occupant classifier 30, the speech disorder classifier 32, and the manual classifier 34 may store data and receive trend and historical data from a relational database 37. Voice signals are received by the controller 13 via the voice senor 38, which may be of various types and styles known in the art. The voice senor 38 may be wireless and located near a vehicle occupant normally seated position so that audible levels of received voice signals are appropriate for the voice command system 24. Note that some physical disabilities have associated limitations on verbal audible levels; this can be accounted for by the stated placement of the voice senor 38.

The occupant classifier 30 may include spectral filters 40, which may be software based, for determining the profile and state of mind of the vehicle occupant. The spectral filters 40 may monitor amplitude and frequency of received voice signals and compare that to known trends, historical data, and threshold excursion data to identify the occupant, the state of mind and profile of the occupant, and to interpret any commands requested from the occupant.

The speech disorder classifier 32 may store word/term mapping and definitions, as well as higher dimensional phoneme or phonetical structures and word detection parameters. The speech disorder classifier 32 can map voice commands in the vehicle allowing a user the ability to control features provided by the audio/video system 42 and other vehicle system components 44. The speech classifier 32 may monitor and determine speech behavioral characteristics and related information, such as speech amplitude, frequency, and tone, in relation to vehicle status, vehicle operating conditions, and vehicle environmental situations.

The voice recognition system 14 also includes N-dimensional analysis tools 46 and learning algorithms 48. The N-dimensional analysis techniques 46 may include principal-component-analysis (PCM) and support-vector-machines (SVM), as shown, and other known analysis tools and techniques.

The command control system 24 is used by the vehicle occupant to perform various tasks including the stated ergonomic related tasks, as well as other ergonomic and vehicle system component tasks. The vehicle system component tasks may include audio and video control, seat system control, lighting control, navigation system control, telematic control, and night vision system control.

The controller 13 using the collision estimator 26 may determine the collision severity and the collision contact location. The collision estimator 26 is also used in the detection of a collision and samples synchronized voltages from the collision detection sensors 50 for collision-type determination. The controller 13 performs countermeasures in response to the collision severity and the collision contact location. The collision estimator 26 generates a collision severity signal, a collision location signal, and a collision type signal in response to the signals received from the collision sensors 50. The controller 13 may generate countermeasure signals in response to the collision severity signal, the collision location signal, and the collision type signal.

The collision estimator 26 may have a collision confirmation signal output. The confirmation signal output may be utilized by other system controls or safety systems in performance of various countermeasures and other vehicle tasks.

The controller 13 may be microprocessor based such as a computer having a central processing unit, have memory (RAM and/or ROM), and have associated input and output buses. The controller 13 may be in the form of an application-specific integrated circuit or may be formed of other logic devices known in the art. The controller 13 may be a portion of a central vehicle main control unit, an interactive vehicle dynamics module, or a main safety controller.

The controller 13 may include an embedded processor, such as a Windows® based processing unit, or may include and operate on other embedded operating systems, such as QNX®, Linux™, VxWorks™, and/or OS9™. The controller 13 may be coupled to a vehicle BUS (not shown). A link 52 to the audio/video system 42 and voice senor 38 may be provided and used in the operation of the adaptive voice recognition system 14 and the phone 56.

The controller 13 is coupled to the sensor complex 18, which may include various sensors, such as the object sensors 60, the collision detection sensors 50, the vehicle status sensors 64, the road surface detectors 66, and the occupant sensors 68, as well as other sensors, such as the confirmation collision detection sensor 70 and the temperature sensors 72.

The object sensors 60 may be of various types and styles including vision-based, radar, lidar, ultrasonic, active infrared, passive infrared, telematic, motion, or other object detection sensor known in the art. A vision-based sensor may be a camera, a charged-coupled device, an infrared detector, a series of photodiodes, or other vision sensor known in the art. The object detection sensors 60 may perform in addition to object detection, path prediction, target selection, target classification, as well as other known sensor tasks. The object detection sensors 60 may scan an environment and determine curvature of a road or may determine position, velocity, and acceleration of objects relative to the vehicle 12. The object detection sensors 60 may be distributed to various locations throughout the vehicle 12.

The collision detection sensors 50 are/used in the detection of a collision, in the determination of the severity and collision contact location of a collision, and in the determination of collision type. The collision sensors 50 may generate collision detection signals in response to the force or acceleration experienced by each sensor 50. The collision sensors 50 may be in the form of discretized patch sensors or the like. Patch sensors provide a surface area of contact for collision detection as opposed to accelerometers that provide single point detection. The collision sensors 50 may be formed from a poly-vinylidine fluoride (PVDF) material or other material having similar properties. PVDF sensors are based on the piezoelectric phenomenon, which is the ability of materials to develop an electric charge proportional to a mechanical stress. As a polymer, PVDF material is durable and thin and when effectively bonded and embedded does not alter the static and dynamic stiffness and mass characteristics of a vehicle structure, such as that of a vehicle bumper. The collision sensors 50 may be mounted in various locations on the vehicle 12 as known in the art.

The vehicle status sensors 64 determine current vehicle status. The vehicle status sensors 64 may include a yaw rate sensor 74, a velocity or speed sensor 76, tire sensors 78, and other vehicle status sensors known in the art, such as a transmission gear sensor, a throttle sensor, a brake sensor, and a steering column position sensor (which are not shown).

The occupant sensors 68 may be used to determine occupant classification, weight, size, and location within a seat system. The occupant sensors 68 may include seat belt status sensors (not shown) for determining a current position or tension of seat belts within the vehicle 12. Any number of occupant sensors may be used and, all of which may be located in various locations on the vehicle 12.

The controller 13 is coupled to and contains control for the active countermeasures 20 and the passive countermeasures 22. The active countermeasures 20 may include brake control and steering control, as shown, as well as throttle control, suspension control, transmission control, and other vehicle control systems. The controller 13 may signal the vehicle operator via the indicator 80 of an impending potential collision so that the vehicle operator may actively perform a precautionary action, such as applying the brakes or steering to prevent a collision.

The passive countermeasures 22 may include internal air bag control, seatbelt control, knee bolster control, head restraint control, load limiting pedal control, load limiting steering control, pretensioner control, external air bag control, pedestrian protection control, and other passive countermeasures known in the art.

The controller 13 is coupled to the audio/video system 42 and to the displays/indicators 80, which may be part of a signal unit 81, as shown, or may be separate stand-alone devices. The audio/video system 42 and to the displays/indicators 80 may be used to signal or indicate a safety system signal, which may include a warning signal, a collision-warning signal, a countermeasure signal, or an object identification signal in response to the object detection signals. The displays/indicators 80 may include an LED, a light, a heads-up display, a headlight, a taillight, a display system, a telematic system, or other indicator known in the art. The audio/video system 42 and to the displays/indicators 80 may include a navigation/global positioning system 82. The displays/indicators 80 and the audio/video system may supply warning signals, collision-related information, lane departure and lane-keeping information, external-warning signals to objects or pedestrians located outside of the vehicle 12, or other pre and post collision information.

The transceiver 16 is utilized for communication between target vehicles or objects in proximity with the vehicle 12. The controller 13 may, for example, transmit vehicle status and occupant status related information including the state of mind of the occupant to the target vehicles.

The other vehicle system components 44 may include audio and video devices, such as radios, MP3 players, DVD players, satellite radio controls, and CD players. The vehicle system components 44 may also include HVAC system control devices, seat system control devices, light control devices, window and door control devices, navigation system control devices, telematic control devices, and night vision control devices.

The controller 13 is also coupled to the phone 56, the memory 86, and the timer 88, as well as other vehicle system components. The phone 56 may be in the form of a Bluetooth® type phone. The timer 88 may be utilized to time the duration of various events and may be used as a counter.

Figure 2:
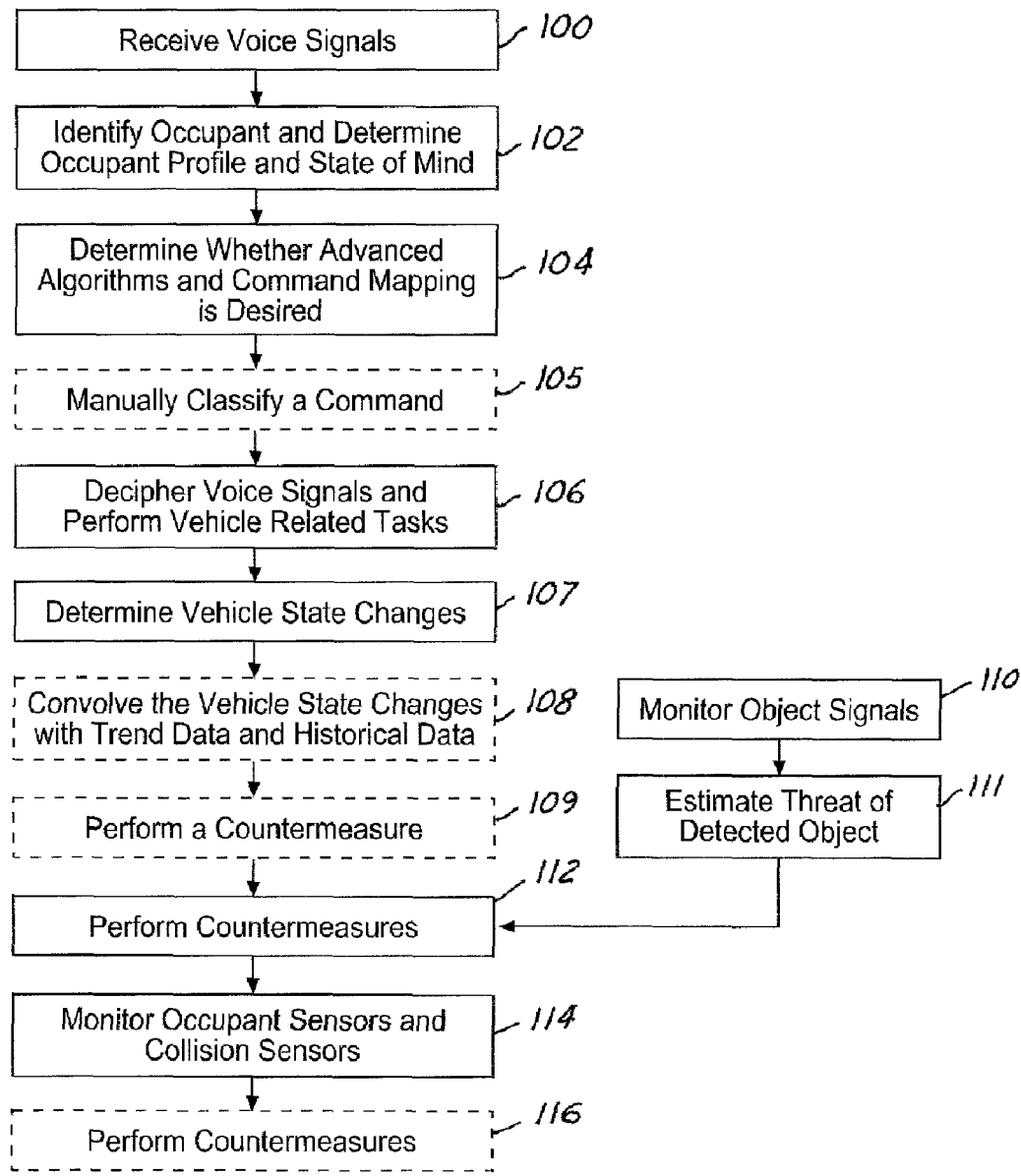
FIG. 2 is a logic flow diagram illustrating a method of performing a safety countermeasure within a host vehicle in accordance with an embodiment of the present invention.

Referring now to FIG. 2, a logic flow diagram illustrating a method of performing a safety countermeasure within the host vehicle 12 in accordance with an embodiment of the present invention is shown.

In step 100, voice signals are received from the vehicle occupant via the voice senor 38.

In step 102, using the spectral filters 40, the occupant classifier 30 identifies the occupant, determines the occupant profile, and determines the focus or state of mind of the occupant. The occupant profile may include stored information associated with vehicle features that are preferred by that particular vehicle occupant, such as seat positions, ergonomic settings, cabin temperature settings, $CO_2$ settings, music type, volume levels, as well as various other vehicle features that may be customized or set in association with a vehicle occupant. The occupant classifier 30 may utilize stored trends, historical data, and threshold excursion data in performing the stated identification and determinations. The threshold excursion data may be based temporally on trip parameters and form the basis for the historical data. The threshold excursion data may include upper and lower thresholds for which an occupant has "normal" tone levels and speech characteristics. The upper and lower levels may be in the form of amplitude and frequencies boundaries or have associated ranges. The state of mind of an occupant may include characteristics corresponding to anxiety, aggression, happiness, and drowsiness, and other state characteristics known in the art.

In step 104, the voice recognition system 14 may determine whether advanced algorithms and command mapping is desired. The relational database 37 may be utilized to provide in-vehicle functions and associated command tree. Vocal characteristics for hearing impaired, such as lisps and other disorders, are used to determine the confidence level of a desired command relative to stored commands or tasks capable and allowed to be performed by the system 10. The N-dimensional analysis tools 46 may be used to decipher the different nuances in voice communication and noise cancellation.

In step 105, the voice recognition system 14 utilizes the manual classifier 34 when a command cannot be determined. A learning session is performed and the N-dimensional analysis space is adjusted to accommodate the entered phoneme structure. Sounds, terms, or phrases that are entered can then be mapped to desired commands and associated tasks. This allows various users including those with speech disorders with the ability to use the voice command system 24.

In step 106, the voice signals are deciphered and associated vehicle related tasks are determined. The voice command system 24 performs vehicle tasks in response to the voice signals when voice commands are detected.

In step 107, the controller 13 may determine vehicle state changes, such as changes in vehicle speed, acceleration, deceleration, steering wheel angle, as well as determine changes in a road segment.

In step 108, the controller 13 may convolve the vehicle state changes with the trend data and the historical data to determine the focus of the occupant. The speech classifier 32 may monitor and determine speech behavioral characteristics and whether the current state of the driver or vehicle occupant corresponds with normal or abnormal behavior depending upon the situation. In step 109, when the occupant behavior is abnormal or deemed inappropriate for the particular situation the occupant may be alerted or some other countermeasure may be performed.

In step 110, the controller 13 monitors the object signals received from the object sensors 60. In step 111, the controller 13 estimates threat of the detected objects using techniques known in the art.

In step 112, countermeasures, such as countermeasures 20 and 22, may be performed. The occupant focus information is used by the collision estimator 26 and algorithms contained therein to bias time-to-warn and time-to-engage countermeasures. When the vehicle occupant is speaking abnormally, such that speech levels exceed one or more of the upper and lower boundaries, the controller 13 may alert the vehicle occupant or perform some other appropriate countermeasure. Target vehicles may be notified of threat assessment values as well as the state of one or more vehicle occupants, especially that of the driver. In sharing this information with target vehicles omni-directional precollision sensing for distances greater than 500 meters can be obtained. The target vehicles may determine the location, speed, and heading of the host vehicle 12, the state of the host vehicle occupants, and other information known in the art such that the target vehicles may perform appropriate countermeasures to avoid a collision. The controller 13 may also receive occupant state information from the target vehicles associated with drivers and occupants of those vehicles and perform countermeasures in response thereto.

The driver state of mind information may be utilized in performing spheroidal partitioning. Spheroidal partitioning is described in further detail in U.S. Pat. No. 6,442,484 B1 by Miller et al., entitled "Method and Apparatus for Precrash Threat Assessment Using Spheroidal Partitioning". The partitioning may be adjusted in response to the state of the vehicle occupant. The threat assessment may be modified, for example, in response to driver focus, which in turn may alter surveillance zone to be activated.

One example, threat assessment technique that may be utilized in conjunction with the above mentioned method is that proposed in U.S. Pat. No. 6,452,535 B1 by Rao et al., entitled "Method and Apparatus for Impact Crash Mitigation". Threat assessment performed in Rao may also be modified in response to the state of mind of a vehicle occupant.

In step 114, the controller 13 monitors the occupant sensors 60 and the collision sensors 70 and receives occupant status signals and collision signals therefrom. The occupant status signals may include occupant information related to occupant classification, weight, size, and location within a seat system, as well as seat belt position or tension information, or other occupant related information known in the art.

In step 116, the controller 13 may perform additional countermeasures in response to the collision signals and the occupant signals.

The above-described steps are meant to be illustrative examples; the steps may be performed sequentially, synchronously, simultaneously, or in a different order depending upon the application.

With advancements in voice recognition and speech synthesis and analysis, voice control of vehicle features and functions is possible. Traditional speech recognition systems are capable of detecting and deciphering "normal" speech whereby a user speaks clearly, loudly, and audibly into a microphone. Accents, speech disorders, and other physical challenges are not presently addressed. The present invention accounts for such disorders and in so doing increases driver focus.

The present invention also in determining the driver state of mind and in performing countermeasures in response thereto increases safety of a vehicle and nearby vehicles. Increase in driver focus and vehicle and occupant safety increases customer loyalty.

while the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A safety system for a host vehicle comprising:
   a voice sensor detecting voice signals from at least one vehicle occupant;
   an occupant classifier determining a state of mind of said at least one vehicle occupant; and
   a controller performing a safety countermeasure in response to said state of mind comprising transmitting said state of mind to at least one target vehicle.

2. A system as in claim 1 wherein said voice sensor is in the form of at least one microphone.

3. A system as in claim 1 wherein said occupant classifier determines said state of mind in response to at least one of voice signal frequency and voice signal amplitude.

4. A system as in claim 1 wherein said occupant classifier determines and profiles said at least one vehicle occupant in response to historical data and threshold excursion data.

5. A system as in claim 1 further comprising a speech classifier identifying said at least one vehicle occupant in response to at least one speech characteristic associated with said voice signals, said controller performing at least one vehicle related task in response to said voice signals and said vehicle occupant identification.

6. A system as in claim 5 wherein said speech classifier in monitoring said at least one speech characteristic monitors a vehicle occupant identifiable and associated speech characteristic.

7. A system as in claim 6 wherein said vehicle occupant identifiable and associated speech characteristic comprises at least one speech irregularity.

8. A system as in claim 7 wherein said at least one speech irregularity comprises at least one of a speech impediment, a speech disorder, a lisp, and an accent.

9. A system as in claim 1 wherein said controller assesses a collision threat using spheroidal partitioning in response to said state of mind.

10. A vehicle voice control system comprising:
    a voice sensor detecting voice signals from at least one vehicle occupant;
    a speech classifier monitoring at least one speech characteristic comprising a vehicle occupant identifiable and associated speech characteristic in response to said voice signals and associating said voice signals with at least one vehicle related task in response thereto; and
    a controller performing said at least one vehicle related task in response to said voice signals and said association.

11. A system as in claim 10 wherein said speech classifier comprises an n-dimensional analysis tool to determine a voice command.

12. A system as in claim 10 wherein said speech classifier comprises learning algorithms that store vehicle occupant speech identification and behavioral characteristic related information.

13. A system as in claim 12 wherein said behavioral characteristic related information comprises at least one of speech amplitude, frequency, and tone, in relation to vehicle status, vehicle operating conditions, and vehicle environmental situations.

14. A system as in claim 10 wherein said speech classifier comprises a manual classifier.

15. A system as in claim 14 further comprising a manual input device for term identification associated with a verbal statement.

16. A system as in claim 10 wherein said speech classifier comprises at least one spectral filter filtering said voice signal to identify said at least one vehicle occupant.

17. A system as in claim 10 wherein said vehicle related tasks are selected from at least one of a vision system task, a safety system task, a navigation system task, telematic system task, a climate control task, a communication system task, an audio system task, a video system task, and a vehicle status determination task.

18. A system as in claim 10 wherein said speech classifier adaptively alters speech identification and behavioral characteristic related information and generates an occupant relational/history database.

19. A method of performing a safety countermeasure within a host vehicle comprising:
    detecting voice signals from at least one vehicle occupant;
    monitoring at least one speech characteristic in response to said voice signals including a vehicle occupant identifiable and associated speech characteristic;
    identifying said at least one vehicle occupant;
    determining a state of mind of said at least one vehicle occupant in response to said voice signals and said identification; and
    performing the safety countermeasure in response to said state of mind comprising transmitting said state of mind to at least one target vehicle.

20. A method as in claim 19 further comprising invoking a manual training session when a voice command is not recognized.

* * * * *